Patented Aug. 14, 1945

2,382,238

UNITED STATES PATENT OFFICE 2,382,238

SYNTHETIC PLASTICS AND FILMS AND PROCESS OF PRODUCING THEM

Walter Laufenberg, Berlin - Lankwitz, Erich Maslanka, Birkenwerder, near Berlin, and Helmut Weissenburger, Berlin-Tempelhof, Germany, assignors, by mesne assignments, to The Licoro Corporation, New York, N. Y., a corporation of Delaware No Drawing. Application June 23, 1941, Serial No. 399,394. In Germany December 23, 1939

5 Claims. (Cl. 260—14)

This invention relates to synthetic plastics and films and to a process of producing them.

It is known that, by condensing aldehydes with phenols and amines and/or amides, products can be obtained that disclose more or less strongly marked resinlike properties, depending on the degree of condensation. Condensation products of this class prepared from amines or amides, aldehydes and phenols have repeatedly been described and particularly recommended for use as tanning matters, washing agents, fixing agents for dyestuffs, sizing agents for textiles and also as binders for varnishes, though they have not been widely used as yet for the last-mentioned purpose, which is partly due to the fact that they are highly sensitive to water, some being even slightly water soluble. This property is so marked even in combination with other raw materials employed in the preparation of varnishes that their use for the purpose mentioned has not appeared promising and such use in fact failed to constitute an improvement over the phenol-formaldehyde resinoids hitherto employed.

According to the present invention, it has now been found that, by combining the condensation products mentioned with nitrocellulose or other compounds containing nitrate or nitrite, films or masses possessing novel properties can be produced which render these condensation products extremely valuable. The films and masses obtained thereby are absolutely insoluble in organic solvents in the cold and in the heat, and it is immaterial whether the reaction of the condensation products mentioned upon nitrocellulose occurs in the cold or heat.

The above-mentioned condensation products are prepared from phenols, aldehydes and aliphatic amines and/or amides by condensing mixtures of 1 mol phenol and at least 0.5 mol amine with at least 1.5 mols aldehyde, it being immaterial whether all these components are condensed jointly or first a phenol-formaldehyde condensate or an amine-formaldehyde condensate is prepared and then the final stage of condensation is reached by adding amine or phenol and possibly other aldehydes. Furthermore, it does not matter whether the components free from solvents are used for condensation or the solution occurs in aqueous or alcoholic or other media.

Condensation should be carried out as far as possible, though the product obtained should be soluble in organic solvents. Although normally heat need not be supplied during the condensation, it is permissible to apply heat for some time in case of small amounts of aldehydes or of difficultly condensable amines, phenols or aldehydes.

The resins obtained are then freed from volatile constituents in known manner and may be modified as required by the addition of carboxylic acids, such as resinic, fatty or phthalic acids, etc.

Suitable amines are for instance ethylene diamine, diethylenetriamine, triethylenetetramine, ethamino-N-piperazine, $\beta,\beta'$-diaminoethylether, 1,3 diaminoisopropyl alcohol, 1,2 diphenylethylenediamine, etc. The amino groups may be partly acylated, and the amines may, moreover, possess also other substituents, as carboxyl groups, halogens, tertiary amino groups, hydroxyl and sulfur groups.

Suitable aldehydes are for instance formaldehyde, acetaldehyde, crotonic aldehyde and benzoic aldehyde.

Suitable phenols are for instance, besides phenol itself, cresols, dihydroxybenzenes, naphthols and their substituted primary derivatives.

When the above-mentioned condensation products are reacted with nitrocellulose in solid or dissolved form, films or plastic masses practically insoluble in the heat and cold in all organic solvents are produced, the amount of nitrocellulose added, depending on the degree of condensation and the composition of the products, being such as to yield the most favorable properties with respect to insolubility in view of the original solvents.

The synthetic plastics or films obtained afford, furthermore, the advantage of combining the excellent properties of nitrocellulose with respect to varnish with the well-known superior features of the thermosetting phenol-formaldehyde resols. The films prepared according to the invention are much better as to adhesiveness than nitrocellulose films and disclose the hardness of burned-in phenol-formaldehyde resins, though they differ from these thermosetting resins in that they are produced at room temperature without the least supply of heat. Compared with cold-setting phenol-formaldehyde resins, these combinations are superior in so far as they require no corroding catalysts for setting.

Besides being applicable to numerous other uses, the process according to the invention makes possible for instance the production of coating films insoluble in organic solvents on bulky parts or containers on which such films or coats could hitherto be developed only by employing thermosetting resol resins and burning them in for several hours at a temperature of 140–160° C. It is evident that the use of materials which produce the same final effect at room temperature is much more advantageous.

The following examples specify preparations that have given satisfaction:

Example 1

A mixture of 45.4 g. ethylenediaminehydrate and 54.6 g. phenol is mixed with moderate external cooling with 130 cc. of a formaldehyde solution of 42 g. in 100 cc. while alcohol or another solvent is added in amounts sufficient to keep the solution clear. Having been heated with reflux for half an hour, the resin is freed from solvent in vacuo. The almost colorless resin is then dissolved in alcohol in the ratio of two to one.

The addition of 100 parts of the resin described to 300 parts of nitro-varnish consisting of

|  | Parts |
|---|---|
| Nitrocellulose | 21 |
| Butanol | 10 |
| Butyl acetate | 15 |
| Ethyl glycol | 5 |
| Sipalin M. O. M. (dimethylcyclohexyl-methyladipate) | 2 |
| Spirit | 25 |
| Acetic ester | 22 | yields a varnish that can be applied by brushing, spraying or dipping and a few days after application forms on its support a layer which is insoluble in almost all organic solvents.

Example 2

The phenol-ethylenediamine mixture of Example 1 is mixed with 115 cu. cm. formaldehyde solution while alcohol is added. The mixture is then heated for a quarter of an hour under a reflux condenser, the solvent and the water are distilled off at normal pressure and heating is then continued for 15 minutes to 130° C. This resin, dissolved in alcohol, was added to a nitrocellulose varnish in the ratio of 1:0.6.

The layer of varnish applied to wood, metal or paper was found to be solvent-proof already after a short time like that in Example 1. The unused varnish solidified after some time to form a porous mass from which the solvent could be squeezed out by hand.

Example 3

47.5 g. phenol and 53 g. diethylenetriamine are condensed with 79 cc. formaldehyde solution (42 g. in 100 cu. cm.), freed from water and alcohol at normal pressure and after complete dehydration heated for 20 minutes up to 130° C.

40 g. of the resulting resin are then dissolved in 55 g. alcohol and 10 g. butyl acetate, whereupon 35 g. iron oxide pigment are mixed with the solution to which a solution of 18 g. nitrocellulose in 10 g. butanol, 25 g. acetic ester, 5 g. ethyl glycol and 2 g. Sipalin M. O. M. (dimethylcyclohexyl-methyladipate) is added, preferably shortly before use.

Sheet iron sprayed with this mixture was found to possess a varnish film unaffected by solvents. Still more elastic films are obtainable by modifying the resin with a fatty acid.

Example 4

36 g. nitrocellulose are moistened with some acetone and while heated kneaded with 40 g. of the resin of Example 3. From this mass to which pigments, sawdust or asbestos may be added solvent-proof vessels, etc., can be formed.

Example 5

The procedure indicated in Example 3 was modified so that the amine was first condensed with formaldehyde under cooling and after the addition of phenol the preparation was heated for some time. The product obtained corresponded approximately to the resin of Example 3 and on being mixed with nitrocellulose varnish yielded varnishes showing similar properties.

Example 6

47 g. phenol and 53 g. $\beta,\beta'$ diaminoethyl ether were condensed as in Example 3, though with 110 cc. formaldehyde solution. With this resin the following varnish was mixed:

|  | Parts |
|---|---|
| Aluminum bronze | 10 |
| $\beta,\beta'$-Diaminoethyl ether-phenol-resin | 25 |
| Nitrocellulose | 16 |
| Alcohol | 35 |
| Butanol | 5 |
| Toluene | 20 |
| Ethyl glycol | 3 |
| Acetic ester | 20 |
| Butyl acetate | 9 |
| Sipaline (dimethylcyclohexyl-methyladipate) | 10 |
| Clophen A 60 (chlorinated diphenyl) | 1 |
| Cyclanon resin | 2 |

Example 7

51 g. m-cresol and 59 g. diethylenetriamine are, as in Example 3, condensed with 74 cu. cm. formaldehyde and dehydrated. To produce a varnish yielding an insoluble film the mixture was chosen so as to have 0.5 part nitrocellulose for 1 part resin.

Example 8

The phenol-amine mixture of Example 3 was condensed with 77.5 g. croton aldehyde while alcohol was added and some cooling was resorted to. After condensation the mixture was heated with reflux for half an hour. The resin obtained was dehydrated in vacuo and heated to 100° C. for 30 minutes.

Varnishes prepared with this resin, in which nitrocellulose and resin were present in a ratio of 0.8 to 1, yielded quite stable, though somewhat darker coatings, for instance on metal.

It will be noted that the maximum ratio of aldehyde to phenol used in the above examples is about 3.14 to 1, while the maximum ratio of amine to phenol is about 1.2 to 1. And, as stated previously, those ratios should be at least about 1.5 to 1 and 0.5 to 1, respectively. The amines mentioned in the preceding description as being operative in our process are all poly-amines having a primary amine group.

What is claimed is:

1. The process of preparing synthetic plastics, films and the like which after drying are insoluble in organic solvents at room temperatures, comprising condensing from about 0.5 to 1.2 moles of an aliphatic polyamine having a primary amine group, and from about 1.5 to 3.14 moles of an aldehyde with 1 mole of a phenol to the point at which the condensation product is still soluble in organic solvents, mixing the resulting resin with a nitrocellulose varnish and promptly applying the mixture to a base to be coated.

2. The process of preparing synthetic plastics, films and the like which after drying are insoluble in organic solvents at room temperatures, comprising condensing from about 0.5 to 1.2 moles of an aliphatic polyamine having a primary amine group, and from about 1.5 to 3.14 moles of an aldehyde with 1 mole of a phenol to the point at which the condensation product is still soluble in organic solvents, removing any volatile solvents from the resulting resin and kneading with nitrocellulose while heating in the presence of a small amount of an inert solvent.

3. A synthetic product suitable for use in producing plastic articles, films and the like, which comprises a reaction product of nitrocellulose with a condensation product, formed by condensing from about 0.5 to 1.2 moles of an aliphatic polyamine having a primary amine group with from about 1.5 to 3.14 moles of an aldehyde and with 1 mole of a phenol to the point at which the condensation product is still soluble in organic solvents, said synthetic product when dried being insoluble in organic solvents.

4. The process of preparing synthetic plastics, films and the like which after drying are insoluble in organic solvents at room temperatures, which comprises condensing about 1 mole of a phenol with from about 0.5 to 1.2 moles of an aliphatic polyamine having a primary amine group and from about 1.5 to 3.14 moles of an aldehyde to the point at which the condensation product is still soluble in organic solvents, then reacting said condensation product with nitrocellulose.

5. A synthetic product suitable for use in producing plastic articles, films and the like, which comprises a mixture of a nitrocellulose varnish with a partial condensation product formed by condensing 1 mole of a phenol with from about 0.5 to 1.2 moles of an aliphatic polyamine having a primary amine group and with from about 1.5 to 3.14 moles of an aldehyde to the point at which the condensation product is still soluble in organic solvents, said synthetic product when dried being insoluble in organic solvents.

WALTER LAUFENBERG.
ERICH MASLANKA.
HELMUT WEISSENBURGER.